United States Patent [19]

Knapp et al.

[11] Patent Number: 4,653,720

[45] Date of Patent: Mar. 31, 1987

[54] ELECTROMAGNETICALLY ACTUATABLE FUEL INJECTION VALVE

[75] Inventors: Heinrich Knapp, Leonberg; Rudolf Krauss, Stuttgart; Rudolf Sauer, Benningen; Jahinid-Singh Sumal, Vaihingen-Ensingen, all of Fed. Rep. of Germany

[73] Assignee: Robert Bosch GmbH, Stuttgart, Fed. Rep. of Germany

[21] Appl. No.: 831,748

[22] Filed: Feb. 21, 1986

[30] Foreign Application Priority Data

Mar. 2, 1985 [DE] Fed. Rep. of Germany ....... 3507443

[51] Int. Cl.[4] ........................ F16K 31/08; F02M 51/06

[52] U.S. Cl. ................................ 251/65; 251/129.15; 239/452; 239/585

[58] Field of Search ............................ 251/129.15, 65; 239/585, 452, 584

[56] References Cited

U.S. PATENT DOCUMENTS 2,901,185 8/1959 Dickey ............................ 239/584 X
3,249,308 5/1966 Cadiou ............................ 239/584 X
3,368,761 2/1968 Pelizzoni ......................... 239/584 X
4,423,841 1/1984 Palma ......................... 251/129.15 X
4,454,990 6/1984 Lewis ................................. 239/585
4,546,339 10/1985 Kubach .
4,575,008 3/1986 Kaczynski ...................... 239/585 X

*Primary Examiner*—Arnold Rosenthal
*Attorney, Agent, or Firm*—Edwin E. Greigg

[57] ABSTRACT

An electromagnetically actuatable fuel injection valve which serves to supply fuel to a mixture-compressing internal combustion engine having externally supplied ignition. The fuel injection valve includes a valve housing having an outlet tube in which a valve seat body is disposed. Respective magnetic coils are disposed on pole pieces and a permanent magnet is disposed between the pole portions of the pole pieces. In the valve seat body a flow bore is provided, which merges via a stop face with a guide bore, in which a ball-shaped armature is slidably disposed. A valve needle which is joined with the armature protrudes through the flow bore and, with a closing head, cooperates with a valve seat in the valve seat body. Directly upstream of the closing head a metering collar is provided on the valve needle, an annular metering gap being formed between the metering collar and the wall of the flow bore. The valve needle is supported in pendulum fashion in the flow bore via the ball-shaped armature and, when the valve is opened, it is centered in the flow bore by the fuel flowing therein.

4 Claims, 2 Drawing Figures

ELECTROMAGNETICALLY ACTUATABLE FUEL INJECTION VALVE

BACKGROUND OF THE INVENTION

The invention is directed to improvements in electromagnetically actuatable fuel injection valves. A fuel injection valve is already known in which the valve needle that is joined to the armature protrudes without radial guidance through a valve seat body, so there is a danger that the valve needle will not be exactly centered; this not only means that variable closing forces engage the armature, but also that the closing head is seated eccentrically on the valve seat. The undesirable effect of this eccentricity is a change in the quantity of fuel ejected.

OBJECT AND SUMMARY OF THE INVENTION

It is a principal object to provide an electromagnetically actuatable fuel injection valve according to the invention having the advantage over the prior art that one end of the valve needle is guided with only an insignificant amount of friction in terms of the dynamics of the valve needle, while the end of the valve needle oriented toward the closing head is automatically centered by the fuel that is to be injected, thus, the fuel metering location is shifted to upstream of the valve seat. As a result, not only are the valve needle and armature guided accurately, which produces a homogeneous, uniform fuel stream during injection, but also the hysteresis effect created between the various closing and opening movements of the valve needle is negligible making it possible to adhere to the precise pre-specified fuel injection quantity. Radially supporting the ball-like armature enables the valve needle to swing in pendulum fashion, so that it can be centered by the flowing fuel.

It is another object and an advantageous feature of the invention to provide the valve needle with a metering collar directly upstream of the closing head, forming an annular metering gap between this metering collar and the wall of the flow bore. As a result, no further machining of the flow bore wall in the metering zone is necessary.

It is still another object to provide the flow bore with a restriction immediately upstream of the valve seat, thereby forming an annular metering gap in cooperation with the valve needle. This restriction makes it possible for the valve needle to have a shaft of uniform diameter between the armature and the closing head.

Yet another object and advantageous feature involves providing the ball-shaped armature with a flattened area remote from the core, which means that only an approximate centering of the armature with respect to the core is required.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
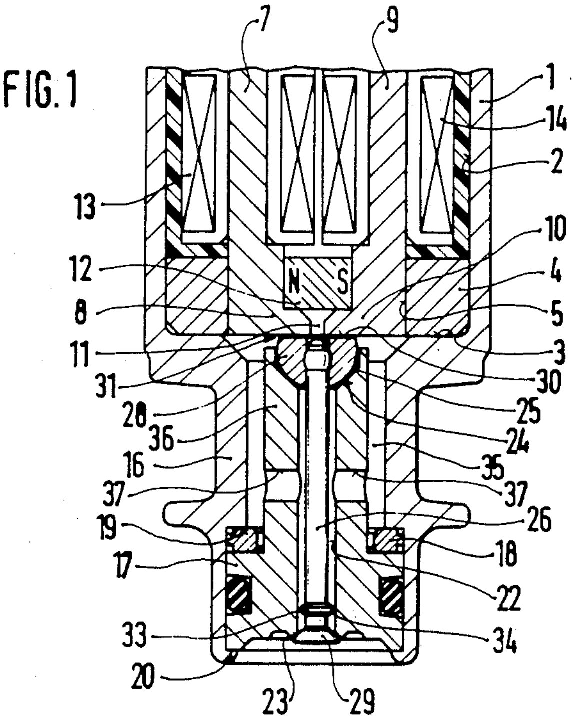
FIG. 1 shows a first exemplary embodiment of a fuel injection valve according to the invention.

The fuel injection valve shown in FIG. 1, intended for a fuel injection system in a mixture-compressing internal combustion engine having externally supplied ignition, has a valve housing 1 of ferromagnetic material, the stepped internal housing bore 2 of which has a first shoulder 3, resting on which is a base plate 4 of ferromagnetic material. A first pole piece 7 having a first angularly extended pole portion 8 and a second pole piece 9 having a second angularly extended pole portion 10 protrude into a central recess 5 within the base plate 4. The pole portions 8 and 10, which are arranged to opposition so as to face one another, form a pole air gap 11 between them, which is partially bridged by a permanent magnet 12. Inside the inner bore 2 of the housing, a first magnetic coil 13 is disposed on the first pole piece 7 and a second magnetic coil 14 is disposed on the second pole piece 9, the magnetic coils being located above the pole portions 8, 10.

Adjacent to the area receiving the magnetic coils, the valve housing 1 has a outlet tube 16 of a smaller diameter; the inner housing bore 2 extends into this outlet tube 16 and receives a valve seat body 17, which via the interposition of an intermediate ring 18 rests on a second shoulder 19 of the inner housing bore 2. The rim of the outlet tube 16 takes the form of a crimped rim 20, partly encompassing the valve seat body 17 and pressing it toward the second shoulder 19 against the intermediate ring 18. In the axial direction, the valve seat body 17 has a continuous flow bore 22, which discharges outwardly into a fixed valve seat 23, provided on the valve seat body 17. Remote from the valve seat 23, the flow bore 22 merges with a beveled stop face 24, countersunk into the valve seat body 17, the diameter of which stop face increases via walls which diverge into an adjacent cylindrical guide bore 25. The flow bore 22 is penetrated, with a large amount of play, by a valve needle 26, on one end of which a ball-shaped armature 28 is fixed, which armature is made of ferromagnetic material and is slidably supported in the guide bore 25 with a little radial play therebetween. Remote from the armature 28, a closing head 29 which cooperates with the valve seat 23 is formed on the valve needle 26. The armature 28 has a flattened upper area 30, oriented toward the pole pieces 7, 9 serving as a core, and when the magnetic coils 13, 14 are not excited the armature 28 is drawn by the permanent magnetic field of the permanent magnet 12 toward the pole portion 8, 10, although an air gap 31 still remains when the closing head 29 is resting on the valve seat 23.

In this non-excited position, the ball-shaped armature 28 has lifted away from the stop face 24. Radial guidance of the ball-shaped armature 28 is effected on its circumference by virtually linear contact in the guide bore 25. Directly upstream of the closing head 29, a metering collar 33 is formed on the valve needle 26, and with the wall of the flow bore 22 this metering collar 33 acts as a throttle restriction for the fuel, forming an annular metering gap 34, at which point the pressure of the fuel drops by approximately 90% as compared with the ambient pressure prevailing downstream of the valve seat 23. The remaining 10% of the fuel pressure as compared with the ambient pressure is dispelled at the flow cross section between the valve seat 23 and the closing head 29. Disposing the annular metering gap 34 directly upstream of the valve seat 23 has the adyantage that the fuel metering takes place at a location at which the annular metering gap 34 is not exposed to contaminants in the intake tube atmosphere, such as superfine dust and particles from the recirculated exhaust gas, which would alter the quantity of fuel metered during operation. The supply of fuel to the flow bore 22 is effected in an annular passage 35 formed between a step 36 of the valve seat body 17 and the inner housing bore 2, which on the one hand leads to a fuel supply connection, not shown, of a fuel feed pump and from which on the other hand radial bores 37 lead to the flow bore 22.

As already noted, the armature 28 is drawn toward the pole portions 8, 10 when the magnetic coils 13, 14 are not excited and thereby holds the closing head 29 on the valve seat 23. Upon appropriate excitation of the magnetic coils 13, 14, the permanent magnetic flux at the armature 28 is countered by an electromagnetic flux of approximately equal magnitude; as a result, the pressure force of the fuel that engages the valve needle in the opening direction of the valve is sufficient to lift the closing head 29 from the valve seat 23 and to cause the armature 28 to execute a stroke movement until it rests on the stop face 24. The stroke movement of the armature 28 or of the closing head 29 relative to the valve seat 23 can be adjusted in a known manner before the armature 28 is affixed to the valve needle 26. If the closing head 29 is raised outwardly from the valve seat 23, the fuel flowing to the valve seat 23 simultaneously centers the valve needle 26 in the flow bore 22.

Figure 2:
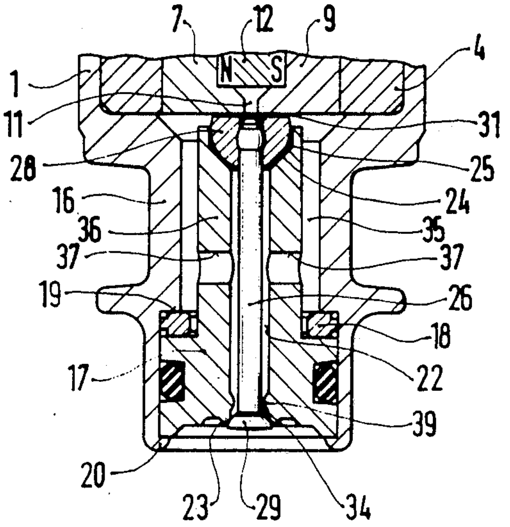
FIG. 2 shows a detail of a second exemplary embodiment of a fuel injection valve according to the invention.

In the exemplary embodiment shown in a partial view in FIG. 2, elements having the same embodiment and function as those of FIG. 1 are identified by the same reference numerals. Differing from the exemplary embodiment of FIG. 1, the exemplary embodiment of FIG. 2 has its annular metering gap 34 formed by the provision of an annular restriction 39 in the flow bore 22 directly upstream of the valve seat 23. In this embodiment, the fuel is throttled in the annular metering gap 34 thereby formed between the restriction 39 and the valve needle 26.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electromagnetically actuatable fuel injection valve comprising a valve housing, a valve seat body disposed within the valve housing, at least one magnetic coil and an associated core assembly being disposed in the valve housing, said core assembly having a permanent magnet disposed thereon, a valve needle disposed in a flow bore provided in the valve seat body with play therebetween, the valve needle having a closing head at one extremity thereof for cooperation with a fixed valve seat disposed in the valve seat body, said closing head moving away from said valve seat in an outward direction to open the fuel injection valve, an armature being positively associated with the valve needle, the armature further being substantially ball-shaped and supported about its circumference in a guide bore provided in the valve seat body, the guide bore communicating with the flow bore as an extension thereof, the valve needle being adapted to execute a stroke to move the armature away from the core assembly, the extent of which stroke is limited by a stop face provided between the guide bore and the flow bore and means are associated with said valve needle to effect substantially fuel metering in the flow bore directly upstream of the valve seat.

2. A fuel injection valve as defined by claim 1, further comprising said means includes a metering collar provided on the valve needle directly upstream of the closing head and an annular metering gap formed between the metering collar and a wall of the flow bore.

3. A fuel injection valve as defined by claim 1, further comprising said means includes a restriction in the flow bore directly upstream of the valve seat and an annular metering gap formed between the restriction and the valve needle.

4. A fuel injection valve as defined by claim 1, further comprising the armature is provided with a flattened upper wall portion oriented toward the core assembly.

* * * * *